Dec. 12, 1944.   E. W. COOPER   2,364,891
FILM RACK
Filed Dec. 18, 1940
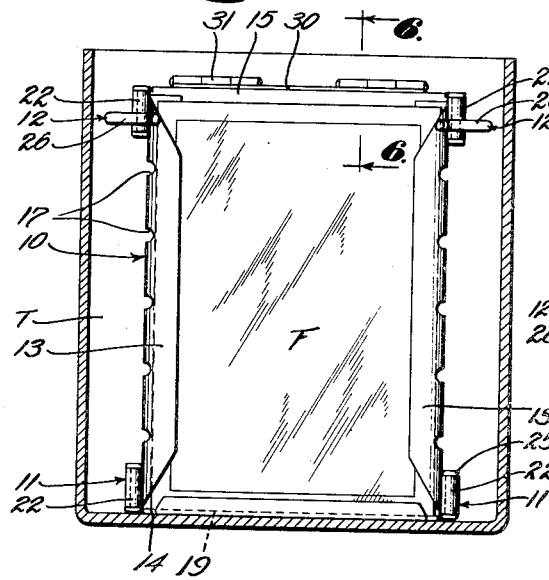
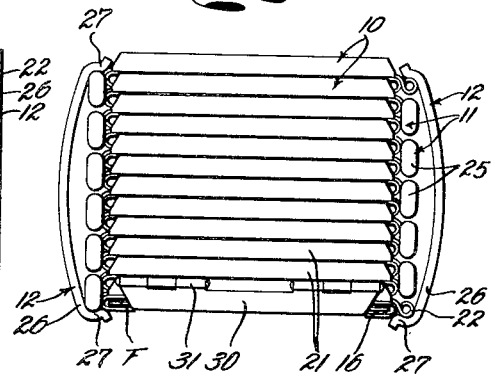
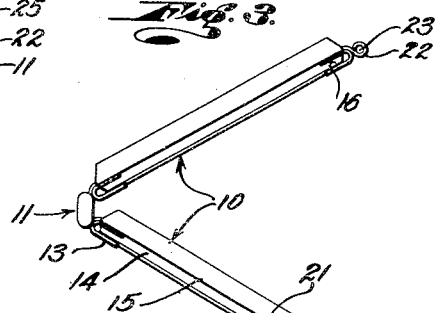
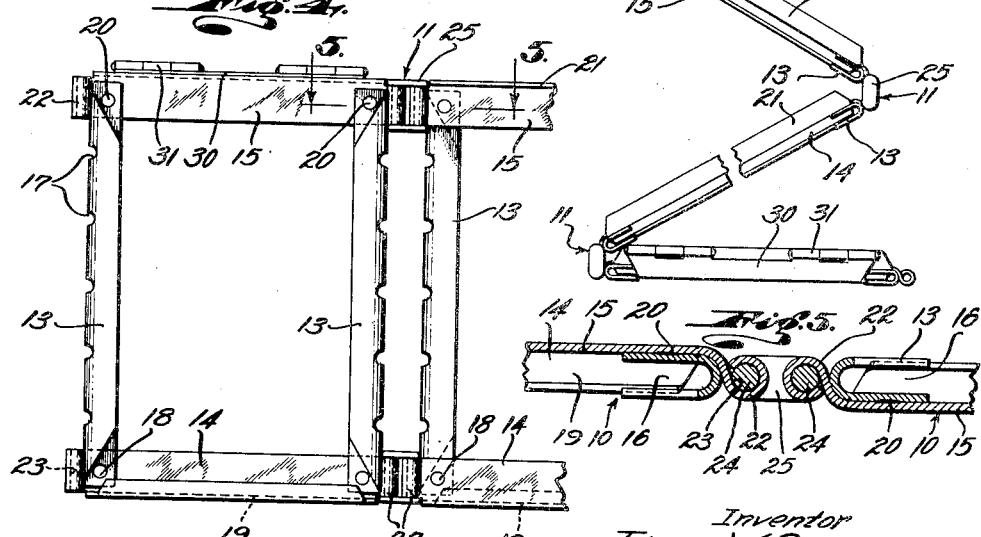
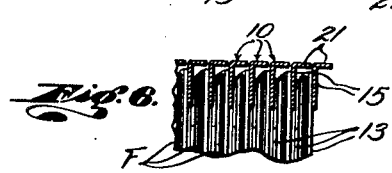
Inventor
ELLIS W. COOPER
By
His Attorney Patented Dec. 12, 1944

2,364,891

UNITED STATES PATENT OFFICE 2,364,891

FILM RACK

Ellis W. Cooper, Los Angeles, Calif., assignor of one-half to Ellis S. Cooper, Los Angeles, Calif.

Application December 18, 1940, Serial No. 370,586

8 Claims. (Cl. 95—100)

This invention relates to film holders and film racks and relates more particularly to film racks useful in holding photographic film during the developing process. A general object of this invention is to provide a practical inexpensive film developing rack which materially facilitates the handling and developing of the film.

In developing the so-called "cut" negative photographic films it is the general practice to either employ separate individual holders for the several films, which are individually placed in the developing tank, or to individually insert the several films in a single rack which in turn is placed in the developing tank. During the developing process it is often desirable to inspect the films to determine their stages of development. When employing the conventional film holders and racks it is impractical to inspect each individual film because of the time and care required for the individual handling of the plurality of films and because there is always danger of scratching or injuring the films in the poor light of the dark room. For this reason it is customary to either merely time the developing period or to inspect only one or two films. If the developing period is "timed" without an inspection of the films the films or certain of them are often either over developed or under developed. The inspection of one or two films does not necessarily reveal the state of development of the entire group of films. Further, the inspection of the individual films does not provide for a comparison of the films one with the other.

Another object of this invention is to provide a film developing rack for receiving and holding a plurality of films which permits the rapid inspection of all of the films and a rapid effective comparison of the several films one with the other without individually handling any of the films. When the film rack of the present invention is removed from the developing tank it may be quickly extended and passed back and forth in front of the safety light to permit an individual inspection of each of the several films and to obtain a comparison of their development stages without directly handing the films.

Another object of this invention is to provide a film rack of the character referred to which allows for the easy individual removal of the films without disturbing the other films. When upon inspection of the several films, as above described, it is found that one or more of the films have been developed to the desired extent, these films may be quickly removed from the rack whereupon the rack may be contracted and replaced in the tank for the further development of the remaining films.

Another object of this invention is to provide a film rack of the character referred to which may be readily extended and placed on a table or like support for the easy insertion of the individual films and then folded into a compact unit for insertion in the developing tank, following which it may be withdrawn at any time and extended and moved back and forth before the safety light for the inspection, comparison and removal of the film.

A further object of this invention is to provide a film developing rack of the character referred to in which the films are automatically locked in their respective cells or holders when the rack is folded into the compact relation for insertion in the developing tank.

A still further object of this invention is to provide a film developing rack of the character referred to that is simple and inexpensive to manufacture and which is easy and convenient to use.

The various objects and features of my invention will be fully understood from the following detailed description of a typical preferred form and application of the invention, throughout which description reference is made to the accompanying drawing, in which:

Fig. 1 is an end elevation of the improved film rack of the invention in the compact operative position within a developing tank, showing the tank in vertical cross section. Fig. 2 is a plan view of the rack removed from the tank. Fig. 3 is a fragmentary plan view of the rack in the extended condition for the insertion and removal of the films. Fig. 4 is a fragmentary face or front view of the rack in an extended condition. Fig. 5 is an enlarged fragmentary horizontal detailed sectional view taken as indicated by line 5—5 on Fig. 4 and Fig. 6 is a fragmentary vertical detailed sectional view taken substantially as indicated by line 6—6 on Fig. 1.

The film rack of the present invention may be said to comprise generally a plurality of units or holders 10 for the individual films F, means 11 hingedly connecting the holders 10 for relative movement between a contracted relationship and an extended condition, and releasable means 12 for retaining or latching the holders 10 in the contracted condition.

The cells or holders 10 comprising a rack of the invention are each adapted to receive or hold a film F. The holders 10 may be shaped and proportioned to handle films of any size and proportion and there may be any selected number of holders. In practice there may be sufficient holders 10 to receive the several films of a conventional film pack. In accordance with the invention the holders 10 may be alike or identical to simplify the construction and reduce the cost of manufacture. The holders 10 are square or rectangular frame-like parts and if desired may be stamped or formed from a single piece of material. The holders each comprise two side members 13, a bottom member 14 and a top member 15. The members 13, 14 and 15 of which the holders 10 are constructed may be formed of a metal or alloy resistanct to the fluids and materials employed in the development and treatment of the film and the members 13, 14 and 15 may be of strip or strap stock.

The side members 13 are elongate parts which are channel shaped or substantially U-shape in transverse cross section to have vertical grooves or channels 16 for receiving the edge portions of the films F. The side parts 13 of each holder 10 are arranged in spaced apart substantially parallel opposed relation to have their channels 16 facing toward one another. Perforations 17 may be spaced along the outer edges of the members 13 to facilitate the circulation of the developing fluids, etc., around the films F. The forward or outer walls of the channel shaped side members 13 are cut or bevelled back at their opposite ends to facilitate the ready insertion of the films and to facilitate the connection of the members with the bottom and top members 14 and 15.

The bottom members 14 serve to connect or tie together the lower ends of the side parts 13 and operate as rests or supports for the lower edges of the films F. The bottom members 14 are arranged against the rear faces of the side members 13 and are joined or fixed to the side members. Spot welds 18 may join or connect the members 14 and their respective side members 13. Other appropriate means for connecting the members 13 and 14 may be employed. The bottom members 14 are sufficiently long to extend beyond the side members 13, the projecting tabs or parts thus provided being employed as elements of the hinge means 11 to be later described. In accordance with the invention the bottom members 14 have lateral or forwardly turned flanges 19 extending along their lower edges. The flanges 19 are at what may be termed the forward sides of the holders 10 so that they oppose or close the lower ends of the film receiving channels 16. The lower edges of the films F engage or rest on the flanges 19 to support the films in the holders 10. The flanges 19 preferably terminate at or below the lower ends of the side members 13 and may curve upwardly along their edges.

The top members 15 of the holders 10 serve to connect or tie together the upper ends of the side members 13 and operate to lock or retain the films F in the holders 10 when the rack is in its contracted or folded together condition. The top members 15 resemble the bottom members 14 each being an elongate strap or strip-like part arranged against the rear faces of its respective side members 13 adjacent the upper ends thereof. Spot welds 20 or other selected means may be employed to rigidly secure the members 15 to the side members 13. The top members 15 extend beyond the side members 13 to have end parts which form elements of the hinge means 11 to be later described. The top member 15 of each holder 10 has a lateral or generally horizontal flange 21 extending along its upper edge. The flanges 21 project in the opposite direction to the bottom flanges 19, that is, the flanges 21 project from the rear sides of the holders 10. Thus the flanges 21 leave the upper ends of the channels 16 open and unobstructed for the free insertion and removal of the films F. The top flanges 21 may be of about the same width as the bottom flanges 19. The flanges 21 are provided to close or overhang the upper ends of the channels 16 and the tops of the adjacent holders 10 when the rack is in its contracted condition to retain or lock the films F in the rack. The film retaining flanges 21 terminate at the outer longitudinal edges of the side members 13. It will be observed that where the several parts of the holders are welded together as above described, the holders are in effect continuous one piece elements.

The hinge means 11 operate to connect the plurality of holders 10 in edge to edge relation so that they may be hinged or swung with respect to one another between the extended relation where the several holders occupy a common plane and the contracted condition where the holders are in parallel adjacent side by side relation. The hinge means comprise vertically spaced aligned tubes or loops 22 on the vertical edges of the holders 10. In the construction illustrated the above mentioned projecting end parts of the bottom and top members 14 and 15 are bent or curled to constitute the loops 22, it being understood that these hinge elements may be formed on or may project from the side members 13. This is best illustrated in Fig. 5 of the drawings. The loops 22 are of substantial width to have vertical openings 23 of considerable length. The hinge openings 23 may have their vertical axes in the central vertical planes of the holders 10.

Links or compound hinge pins are engaged in the set or pairs of adjacent loops 22 of the connected holders 10. These hinge pins each comprise a pair of spaced pin parts 24 and heads or ties 25 connecting the upper and lower ends of the pin parts. The links or compound hinge pins may be shaped from wire of suitable gauge. The pin parts 24 are pivotally received in the loop openings 23 and the ties 25 cooperate with the upper and lower edges of the loops 22 to retain the pin parts in the loops and to prevent relative vertical shifting and displacement of the holders 10.

The relationship between the adjacent holders 10 connected by the hinge means 11, just described, is important. Each holder 10 faces in the opposite direction to its adjacent holder 10, that is, one holder has its open film receiving forward side facing to the right, the next holder 10 has its open front side facing to the left, the third holder 10 has its open forward side facing to the right, the next holder 10 has its open front side facing to the left and so on throughout the series of connected holders. This successive alternate disposition of the holders 10 causes the film retaining flanges 21 to all face in the same direction when the rack is in its contracted relation so that the flanges 21 overlie or overlap the film channels 16 of the adjacent holders to positively retain the films F in the rack. Figs. 2 and 6 clearly illustrate the manner in which the flanges 21 on the oppositely disposed hingedly connected holders 10 overlie the channels 16 and the tops of the holders to prevent displacement of the films F.

With the holders 10 in the contracted or folded together relation the channels 16 of the holder at one end of the assembly are open or uncovered. In practice this endmost holder 10 need not be used to hold a film F or it may be used to hold a film as desired. In cases where the endmost open holder 10 is to be employed to hold a film F a hinged cover 30 may be provided to close its upper end. Suitable hinge means 31 may secure the cover 30 to the top member 15 so that the cover may be readily swung between open and closed positions.

The means 12 for releasably holding the rack in its contracted or compact condition facilitates the handling of the rack and the insertion of the rack in the developing tank T and the subsequent removal of the rack from the tank. The means 12 is not essential in every case and may be varied greatly without departing from the broader aspects of the invention. In the form of the invention illustrated the means 12 comprises two latches or retainers 26 in the form of elongate straps or wires. The retainers 26 are curved or bowed outwardly and their ends are turned in and shaped to form latches or catches 27. The catches 27 are adapted to snap or engage over the hinge loops 22 at the opposite ends of the contracted or folded together rack. In Figs. 1 and 2 I have shown the retainers 26 arranged adjacent the top of the rack to have their catches 27 in latching engagement with the endmost loops 22 at the upper end of the rack structure. The retainers 26 operate to hold the plurality of holders 10 in the contracted relation and may be employed as handles to facilitate the manipulation or handling of the rack. The elongate retainers 26 are flexible and resilient so that their catches 27 may be easily engaged with and disengaged from the endmost hinge loops 22.

In employing the film rack of the invention the holders 10 may be extended or partially extended and placed on a table, bench or the like for the reception of the films F. As clearly illustrated in Fig. 3 of the drawing, the hingedly connected holders 10 may be only partially extended at this time to form a zigzag structure which will maintain itself in the upright condition when placed on the table or bench. The films F may be readily arranged in the holders 10 by merely passing them down into the channels 16. The films F are lowered or inserted to have their lower edges rest on the bottom flanges 19. When the several films F have been inserted in the holders 10 the holders are swung or folded together to lie in adjacent side by side relation and the retainers 26 may be arranged in place if desired. The contracted or folded together rack carrying the films F may then be inserted in the developing tank T. In this connection it will be observed that the rack forms a very compact unit which may be readily placed in the developing tank. The desensitizing fluid, washes, developing fluid, etc., employed in the developing process may be placed in the tank T in the usual manner. The bottom flanges 19 of the holders 10 rest on the bottom of the tank T to support the films F above the tank bottom and the perforated channeled side members 13 protect and shield the edges of the films and yet allow the fluids to freely circulate around and between the films. It is to be understood that the developing tank T may have the usual light-tight top or cover.

During the developing process it may be desired to inspect the films F to determine their respective stages of development. The rack in the contracted or compact state may be readily lifted from the developing tank T and the retainers 26, when employed, may be quickly disengaged from the rack. The endmost holders 10 are then engaged or grasped and the rack is extended to form a single elongate strap or ribbon-like assembly or is partially extended to make two or more of the films F visible. The rack extended in this manner and held by the outstretched hands may be readily passed in front of the inspection lamp or safety light so that each individual film F may be inspected. In this connection it is to be particularly noted that the films F may each be individually inspected and may be compared one with the other to obtain a full comparison of their respective states of development. If it is found that one or more films have attained the desired development such films may be readily withdrawn from their respective holders 10 without disturbing the other films. The rack is then returned to its compact or folded together condition by merely pressing the hinged holder assembly together and the retainers 26 may be reapplied. The contracted rack may then be returned to the tank T for the further development of the films. The inspection and comparison of the films require a minimum of time and do not necessitate individual handling of the films which might result in scratching or injuring them. The films F may be inspected and compared as many times as desired and the films F may be individually removed from the rack as they reach their desired stage of development.

The film developing rack of the present invention is very simple and inexpensive to manufacture and greatly expedites the developing of cut photographic film. When the rack is employed in the film developing process it is possible to simultaneously inspect all of the films being developed and to more readily gauge their stage of development by comparing one with the other. The films are fully protected when in the rack and there is no danger of scratching or injuring them when the rack is folded together and extended. The rack is small and compact and is suited for use in most developing tanks.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A film developing rack comprising a plurality of holders, each holder having means for removably supporting a film, hinge means connecting adjacent edges of the holders to form an articulated assembly capable of extension to bring the holders in line in edge to edge relation and capable of contraction to bring the holders in adjacent side by side relation, and means for preventing upward displacement of the films from the holders when the assembly is in the contracted condition comprising a part projecting from the rear face of each holder to extend over the film receiving portion of an adjacent holder when the holders are in the side by side relation.

2. A film developing rack comprising a plurality of holders, each holder having means for removably supporting a film, hinge means connecting adjacent edges of the holders to form an articulated assembly capable of extension to bring the holders in line in edge to edge relation and capable of contraction to bring the holders in adjacent side by side relation, and a projecting part rigid with each holder for preventing the upward displacement of the film from an adjacent holder when the assembly is in said contracted condition.

3. A film rack comprising a plurality of holders, each holder having a channel in its front face for removably receiving a film, a flange on the rear face of each holder, and hinge means connecting the sections for relative swinging movement between extended positions where they are in a row and contracted positions in face to face relation, said flanges overhanging the channels in the adjacent holders to retain the films therein when the holders are in the contracted position.

4. A film rack comprising a plurality of holders, each including spaced elongate side members having opposing channels for receiving the edge portions of a film, a bottom member attached to the side members, a forwardly turned flange on the bottom member for supporting the film in the channels, a top member attached to the side members, a rearwardly projecting flange on the top member, and hinges connecting the holders for relative swinging between extended positions and contracted positions where they are in adjacent side by side relation, the flanges on the top members overlying said channels of adjacent members to prevent loss of the films.

5. A film rack comprising a plurality of holders, each including spaced elongate side members having opposing channels for receiving the edge portions of a film, a bottom member attached to the side members, a forwardly turned flange on the bottom member for supporting the film in the channels, a top member attached to the side members, a rearwardly projecting flange on the top member, and hinges connecting the holders for relative swinging between extended positions and contracted positions where they are in adjacent side by side relation, the hinges comprising loops on the ends of the top and bottom members, and links engaged in the loops of the adjacent holders, the flanges on the top members overlying said channels of adjacent members, when the holders are in said contracted positions, to prevent loss of the films.

6. A film developing rack comprising a plurality of holders, each holder having means for removably supporting a film, hinge means connecting adjacent edges of the holders to form an articulated assembly capable of extension to bring the holders in line in edge to edge relation and capable of contraction to bring the holders in adjacent side by side relation, and retainers for extending between and removably latching with the hinge means at the opposite ends of the contracted holders to retain the holders in said contracted relation.

7. A film rack comprising a plurality of holders, each including spaced elongate side members having opposing channels for receiving the edge portions of a film, a bottom member attached to the side members, a forwardly turned flange on the bottom member for supporting the film in the channels, a top member attached to the side members, a rearwardly projecting flange on the top member, hinges connecting the holders for relative swinging between extended positions and contracted positions where they are in adjacent side by side relation, the flanges on the top members overlying said channels of adjacent members to prevent loss of the films, and a cover for overlying the channels of the frontmost holder.

8. A film rack comprising a plurality of holders, each including spaced elongate side members having opposing channels for receiving the edge portions of a film, a bottom member attached to the side members, a forwardly turned flange on the bottom member for supporting the film in the channels, a top member attached to the side members, a rearwardly projecting flange on the top member, hinges connecting the holders for relative swinging between extended positions and contracted positions where they are in adjacent side by side relation, the flanges on the top members overlying said channels of adjacent members to prevent loss of the films, and a cover hinged to the frontmost holder for covering its channels.

ELLIS W. COOPER.